(12) United States Patent
Leech et al.

(10) Patent No.: US 6,846,570 B2
(45) Date of Patent: Jan. 25, 2005

(54) MULTIPLE COAT NON-STICK COATING SYSTEM AND ARTICLES COATED WITH SAME

(75) Inventors: Lawrence D. Leech, West Chester, PA (US); Daniel C. Chung, Princeton, NJ (US); Michael W. Miller, Exton, PA (US)

(73) Assignee: Whitford Corporation, West Chester, PA (US)

( * ) Notice: Subject to any disclaimer, the term of this patent is extended or adjusted under 35 U.S.C. 154(b) by 24 days.

(21) Appl. No.: 10/048,782

(22) PCT Filed: Aug. 16, 2001

(86) PCT No.: PCT/US01/41760
§ 371 (c)(1),
(2), (4) Date: Feb. 1, 2002

(87) PCT Pub. No.: WO02/14065
PCT Pub. Date: Feb. 21, 2002

(65) Prior Publication Data
US 2002/0150778 A1 Oct. 17, 2002

Related U.S. Application Data

(60) Provisional application No. 60/225,944, filed on Aug. 17, 2000.

(51) Int. Cl.$^7$ .......................... C08L 77/00; C08L 79/08; B32B 27/34; B32B 27/08
(52) U.S. Cl. .............................. 428/473.5; 428/474.4; 428/475.8; 428/476.3; 524/413; 524/430; 524/444; 524/514; 525/178; 525/179; 525/180
(58) Field of Search .......................... 525/178, 179, 525/180; 524/413, 430, 444, 514; 428/473.5, 474.4, 475.8, 476.3

(56) References Cited

U.S. PATENT DOCUMENTS

| | | |
|---|---|---|
| 3,962,373 A | 6/1976 | Petrucelli |
| 4,090,993 A | 5/1978 | Attwood et al. |
| 4,104,225 A | 8/1978 | Conbere |
| 4,177,320 A | 12/1979 | Yoshimura et al. ......... 428/419 |
| 4,179,542 A | 12/1979 | Christofas et al. |
| 4,200,568 A | 4/1980 | Trautvetter et al. |
| 4,259,463 A | 3/1981 | Moggi et al. |
| 4,343,841 A | 8/1982 | Close |
| 4,393,119 A | 7/1983 | Concannon ................. 428/413 |
| 4,395,445 A | 7/1983 | Gebauer et al. |
| 4,487,878 A | 12/1984 | Vasta |
| 4,506,054 A | 3/1985 | Vasta |
| 4,510,282 A | 4/1985 | Goll .......................... 524/337 |
| 4,546,141 A | 10/1985 | Gebauer |
| 4,770,927 A | 9/1988 | Effenberger et al. |
| 4,777,214 A | 10/1988 | Petersen |
| 4,960,624 A | 10/1990 | Ueno |
| 5,130,201 A * | 7/1992 | Yoshimura et al. |
| 5,168,013 A | 12/1992 | Tannenbaum |
| 5,230,961 A | 7/1993 | Tannenbaum |
| 5,240,775 A | 8/1993 | Tannenbaum |
| 5,250,356 A | 10/1993 | Batzar |
| 5,478,651 A | 12/1995 | Tannenbaum ............... 428/422 |
| 5,562,991 A | 10/1996 | Tannenbaum |
| 5,667,846 A | 9/1997 | Thomas |
| 5,709,949 A | 1/1998 | Chen et al. |
| 5,721,053 A | 2/1998 | Thomas |
| 5,789,083 A | 8/1998 | Thomas |
| 5,854,342 A | 12/1998 | Kirochko et al. |
| 5,880,205 A | 3/1999 | Tannenbaum |
| 5,922,468 A | 7/1999 | Huesmann et al. |
| 6,001,205 A | 12/1999 | Mauro |
| 6,117,508 A | 9/2000 | Parsonage et al. |
| 6,291,054 B1 | 9/2001 | Thomas et al. |

FOREIGN PATENT DOCUMENTS

| | | |
|---|---|---|
| EP | 0 656 831 B1 | 6/1995 |
| EP | 1 016 466 B1 | 7/2000 |
| WO | WO 02/078862 A2 | 10/2002 |

* cited by examiner

Primary Examiner—Ana Woodward
(74) Attorney, Agent, or Firm—Baker & Daniels

(57) ABSTRACT

Multiple coat non-stick coating systems, as well as articles coated with such non-stick coating systems, are provided. The primer (22a) of the multiple coat system includes a fluoropolymer (14a) copolymer, such as a fluoropolymer terpolymer including tetrafluoroethylene, hexafluoropropylene, and vinylidene fluoride monomers, which fluoropolymer copolymers are referred to collectively as THV. The multiple coat system exhibits excellent substrate adhesion and release properties, and the primer exhibits excellent primer-substrate adhesion and primer-topcoat adhesion. The multiple coat system is additionally resistant to separation failure at the interface between the binder (12) and fluoropolymer components of the primer, exhibits excellent adhesion to smooth substrates (16), and may also include a high level of fillers to provide increased damage resistance without compromising the above benefits.

39 Claims, 2 Drawing Sheets

FIG_1 PRIOR ART

FIG_2

FIG_3

MULTIPLE COAT NON-STICK COATING SYSTEM AND ARTICLES COATED WITH SAME

This application is a 371 of PCT/US01/41760 filed Aug. 16, 2001, which claims the benefit of U.S. Application Ser. No. 60/225,999 filed Aug. 17, 2001.

BACKGROUND OF THE INVENTION

1. Field of the Invention

The present invention relates to a non-stick coating system which is applied in multiple coats to the surface of a substrate to thereby provide a coated substrate having a non-stick coating to which extraneous materials will not adhere. The non-stick coating includes a primer, a topcoat, and optionally, a midcoat. More particularly, the present invention relates to a multiple coat composition including a primer which provides excellent substrate adhesion and intercoat adhesion, and also provides excellent intracoat cohesion between the binder and fluoropolymer components thereof.

2. Description of the Related Art

The use of non-stick coating systems which are applied to a substrate in multiples layers has been known for more than 20 years. Typically, these coating systems include two layers consisting of a specially formulated primer and topcoat, but systems incorporating one or more intermediate midcoats are also known. The primers for such systems typically contain a heat resistant organic binder resin and one or more fluoropolymer resins, along with various opaque pigments and fillers. The midcoats contain mainly fluoropolymers with some amounts of opaque pigments, fillers and coalescing aids, while the topcoats are almost entirely composed of fluoropolymers. In such systems, the binder resin of the primer adheres to the substrate, while the fluoropolymer adheres to subsequent midcoat and/or topcoat layers. The binder and fluoropolymer of the primer are attached to one another via an essentially mechanical bond resulting from the mixing of the two components, followed by the curing of the primer after application to a substrate. An early example of such a system is found in U.S. Pat. No. 4,049,863 to Vassiliou (1977).

Over the course of the development of such coating systems, it has come to be accepted that the adhesion of the primers to metal substrates is a function of the amount of organic binder resin present at the interface between the substrate and the coating. It is well known that organic binders, such as polyamideimide, polyether sulfone and polyphenylene sulfide, for example, have excellent adhesion to metals.

Likewise, it has come to be accepted that the adhesion of subsequent layers or coats to the primer depends upon the amount of fluoropolymer present at the interface between the primer and the next layer. This is due to the fact that adhesion between the primer and subsequent layers is achieved by the fusing or sintering of the fluoropolymer in the primer to the fluoropolymer in the subsequent layer during the curing process at temperatures above the melting point of the fluoropolymers.

A mixture of ingredients is expected, however, at both the primer-substrate and the primer topcoat interfaces, because the primers themselves include a mixture of ingredients. Some fluoropolymer will therefore be present at the primer-substrate interface, and thereby adversely affect adhesion to the substrate, and some binder will be present at the primer-topcoat interface, and thereby adversely affect the intercoat adhesion with subsequent layers. For these reasons, much development effort has been directed to achieving a greater degree of separation or stratification between the binder resin and the fluoropolymer in the primer, so that the binder moves to the bottom of the primer layer to increase substrate adhesion, and the fluoropolymer moves to the top of the primer layer to increase intercoat adhesion. Such differences in composition from top to bottom of the primer layer are known as "concentration gradients," and are described in U.S. Pat. No. 4,087,394 to Concannon (1978) and in U.S. Pat. No. 5,240,775 to Tannenbaum (1993).

The development of sharper concentration gradients in primers has become more important with the increased emphasis on applying non-stick multi-layered coatings to "smooth" substrates. Traditionally, metal substrates had been roughened by gritblasting or finishing (sanding) before application of a non-stick coating thereto. Application to "smooth" substrates eliminates the slow and expensive roughening process. For purposes of the present application, a "smooth" substrate refers to a substrate that has been chemically cleaned and lightly etched to an average roughness (Ra) of less than 100 microinches (2.5 microns), and preferably of less than 50 microinches (1.25 micron). By way of comparison, untreated rolled aluminum, for example, has an average roughness of 12–20 microinches (0.25–0.50 microns), and gritblasted aluminum has an average roughness of 160 to 220 microinches (4 to 5.25 microns).

A more recent direction in the development of primers is the inclusion of hard fillers to increase scratch and damage resistance. The use of such fillers is well known, and is also disclosed in U.S. Pat. No. 4,049,863 to Vassiliou (1977), noted above, in a range up to 20% by weight of the solids. More recent disclosures of the use of hard fillers may be found in U.S. Pat. No. 5,250,356 to Batzer (1993) and U.S. Pat. No. 5,562,991 to Tannenbaum (1996), wherein the amount of filler used is as high as 35% by weight of the solid material.

In practice, the main raw materials used in primers for non-stick, multi-layered coatings have not changed greatly in recent years. The preferred organic binder remains a polyamideimide ("PAI") resin, prepared as an aqueous polyamic acid salt. The preferred fluoropolymer remains an aqueous dispersion of polytetrafluoroethylene ("PTFE") resin with a melt viscosity greater than $10^3$ poise. The recent improvements in the performance of primers has come from (1) incrementally enhancing the original, basic mechanism for promoting substrate adhesion and intercoat adhesion, viz., increasing the stratification of the primer through the addition of fluoropolymers such as fluorinated ethylene propylene ("FEP") that have lower melt viscosity and lower melting points than PTFE, and (2) adding ever increasing amounts of hard fillers for improved penetration and scratch resistance.

Adding hard fillers, while increasing the damage resistance of the primer, has the undesirable effect of adding an additional ingredient to the primer, which competes for space at the critical primer-substrate and primer-topcoat interfaces, and thereby detracts from the amount of preferred materials, as described above, which are required at the primer-substrate and primer-topcoat interfaces for maximum bonding.

Additionally, recent effort has been directed to the development of a single coat non-stick coating system having fluoropolymer and binder components, in which stratification between the fluoropolymer and binder is allowed in order to enhance the substrate adhesion and the release properties of the coating without failure between the fluoropolymer and binder components, and also, which coating has excellent adhesion to smooth substrates and allows the incorporation of high levels of fillers thereinto for improved scratch and damage resistance.

Figure 1:
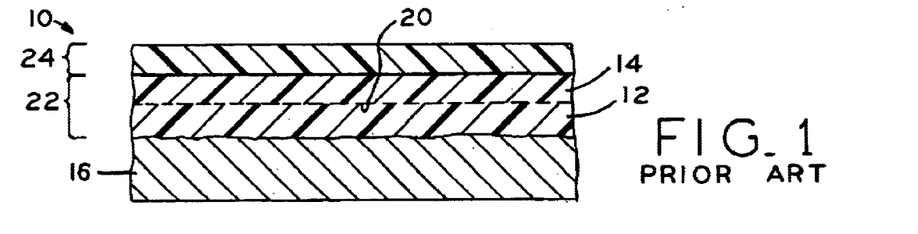
FIG. 1 is a schematic illustration of a substrate surface having a known primer composition adhered thereto, and a topcoat adhered to the primer.

As shown in FIG. 1, compensating for this loss of bond strength by forcing greater separation/stratification of these materials has an obvious limit. In coating system 10, the stratification between binder 12 and fluoropolymer 14 of primer 22 allows binder 12 and fluoropolymer 14 to adhere well to substrate 16 and to topcoat 24, respectively. However, the large degree of stratification between binder 12 and fluoropolymer 14 actually creates, in effect, a new binder-fluoropolymer interface 20. Specifically, the mechanical interconnection between binder 12 and fluoropolymer 14 is minimal, and subject to failure, at binder-fluoropolymer interface 20. Therefore, failure of coating system 10 occurs within primer 22 itself, because the connection between the organic binder and fluoropolymer (the intracoat cohesion) is a mechanical interconnection, and prone to separation failure upon a large degree of stratification within primer 22. The same type of failure illustrated in FIG. 1 may occur in conventional single coat, non-stick coating systems which include fluoropolymer and binder components.

What is needed is a multilayer non-stick coating system, the coating system including a primer which exhibits both excellent primer-substrate adhesion and primer-topcoat adhesion, yet is resistant to separation failure at the interface between the binder and fluoropolymer components of the primer.

A further need is for a multilayer non-stick coating system, including a primer which allows for the incorporation into the primer composition of a high level of fillers to provide increased damage resistance.

A still further need is for a multilayer non-stick coating system, including a primer which has excellent adhesion to a smooth substrate.

SUMMARY OF THE INVENTION

The present invention provides multiple coat non-stick coating systems which include a primer, topcoat, and optionally, a midcoat, as well as substrates coated with the non-stick coating systems. The primer of the multiple coat system includes a fluoropolymer, which is a polymer including a $CF_2$—$CH_2$ moiety in the polymer chain. An exemplary fluoropolymer is a fluoropolymer copolymer, such as a fluoropolymer terpolymer including repeating monomers of tetrafluoroethylene ("TFE"), hexafluoropropylene ("HFP"), and vinylidene fluoride ("VDF"). Fluoropolymer copolymers including TFE, HFP, and VDF are collectively referred to as "THV". Further examples of such fluoropolymers are polyvinylidene fluoride ("PVDF") homopolymers, ethylene tetrafluoroethylene ("ETFE") and HFP/VDF bipolymers, ethylene fluorinated ethylene-propylene ("EFEP") terpolymers, and other possible combinations of ethylene and fluoroethylenic monomers.

Additionally, the inventors have also found that primers including THV, in a multiple coat system, exhibit excellent primer-substrate adhesion and primer-topcoat adhesion. Such primers also have excellent intracoat cohesion, exhibit excellent adhesion to smooth substrates, and may include a high level of fillers to provide increased damage resistance without compromising the above benefits.

In one form thereof, the present invention provides a primer (22a) for a multilayered, non-stick coating system, the primer including at least one binder resin (12), one binder resin including at least one of amide and amine functional groups; and at least one fluoropolymer resin (14a), one fluoropolymer resin capable of reacting with at least one of the amide and amine functional groups of the binder resin (12).

In another form thereof, the present invention provides a multiple-coat, non-stick coating system, including a primer, the primer including a binder resin (12) including at least one of polyamideimide, polyamide, and polyimide; and a fluoropolymer resin (14a) including a copolymer of tetrafluoroethylene, hexafluoropropylene, and vinylidene fluoride monomers; and a topcoat.

In another form thereof, the present invention provides a substrate (16) coated with a multiple-coat, non-stick coating, the non-stick coating including a primer (22a) applied directly on the substrate (16), the primer including a binder resin (12) including at least one of polyamideimide, polyamide, and polyimide; a fluoropolymer resin (14a) including a copolymer having tetrafluoroethylene, hexafluoropropylene, and vinylidene fluoride monomers; and a filler material; and a topcoat (24) applied on said primer, the topcoat comprising polytetrafluoroethylene.

In another form thereof, the present invention provides a method of applying a multiple-coat, non-stick coating system to a smooth substrate (16), including the steps of: dissolving a binder resin (12) in a solvent, the binder resin including at least one of polyamideimide, polyamide, and polyimide; blending the dissolved binder resin with an aqueous dispersion of a fluoropolymer resin (14a) to form a primer, the fluoropolymer resin including a copolymer having TFE, HFP and VDF monomers; applying the primer to a smooth substrate; and curing the applied primer.

BRIEF DESCRIPTION OF THE DRAWINGS

The above-mentioned and other features and advantages of this invention, and the manner of attaining them, will become more apparent and the invention itself will be better understood by reference to the following descriptions of embodiments of the invention taken in conjunction with the accompanying drawings, wherein.

Corresponding reference characters indicate corresponding parts throughout the several views. The exemplifications set out herein illustrates preferred embodiments of the invention, and such exemplifications are not to be construed as limiting the scope of the invention in any manner.

DETAILED DESCRIPTION

The present invention provides multiple coat non-stick coating systems which include a primer, a topcoat, and optionally, a midcoat. The primer includes a fluoropolymer, which is a polymer including a $CF_2$—$CH_2$ moiety in the polymer chain. An exemplary fluoropolymer is a fluoropolymer copolymer, such as a fluoropolymer terpolymer including three repeating monomer units, specifically, each of tetrafluoroethylene ("TFE"), hexafluoropropylene ("HFP"), and vinylidene fluoride ("VDF") units. Fluoropolymer copolymers including TFE, HFP, and VDF monomers are collectively referred to as "THV". One suitable THV terpolymer is Dyneon® E-15851, available from Dyneon LLC, 8744 33$^{rd}$ Street North, Oakdale, Minn., 55128, a 3M Company. (Dyneon® is a registered trademark of Dyneon LLC).

Further examples of such fluoropolymers are polyvinylidene fluoride ("PVDF") homopolymers, ethylene tetrafluoroethylene ("ETFE") and HFP/VDF bipolymers, ethylene fluorinated ethylene-propylene ("EFEP") terpolymers, and other possible combinations of ethylene and fluoroethylenic monomers.

The fluoropolymer may have a melting point of about 220° C. or above, however, fluoropolymers having melting points between about 160° C. and about 250° C. are also suitable.

The present non-stick coating system may be applied to a wide variety of substrates, including but not limited to, metal cookware, printer and photocopier rollers, building materials, industrial tools, and high temperature resistant fabrics such as fiberglass and woven polyaramids.

Improving the connection between the binder and the fluoropolymer allows for stratification in the primer between the binder and fluoropolymer for improved primer-substrate and primer-topcoat adhesion, yet also allows the retention of the intracoat cohesion between the binder and fluoropolymer within the primer. Improving such connection may be accomplished by: (1) improving the wetting of the fluoropolymer by the binder, and (2) by creating a chemical bond, as opposed to a mechanical interconnection, between the binder and the fluoropolymer.

The present inventors have found that the addition of the THV terpolymer, for example, to a primer in a multiple coat system results in a primer which has excellent substrate adhesion and topcoat adhesion, yet is resistant to separation failure between the fluoropolymer and binder components.

It is believed that THV accomplishes these improvements because (1) the VDF monomer in the THV terpolymer provides a slight increase in the surface energy of the fluoropolymer to thereby increase the wetting and adhesive contact with the binder, as demonstrated in Examples I, II(A), and II(B), and (2) the VDF monomer provides a reactive site that creates a chemical bond between the THV terpolymer and binder resins which include terminal amine and amide groups.

Regarding (1) above, the ability for the fluoropolymer and binder to be wetted onto one another, such that the binder and fluoropolymer are in intimate adhesive contact, is a function of the surface energies of the binder and fluoropolymer. Ideally, the surface energies of the binder and the fluoropolymer are substantially equal, to maximize the wetting therebetween. Because fluoropolymers have low surface energies (typically less than 25 dynes/cm), a significant difference in surface energies typically exists between the binder and the fluoropolymer, inhibiting the wetting therebetween. It is believed that the VDF monomer in the THV terpolymer provides a slight increase in the surface energy of the THV terpolymer, which in turn provides a corresponding decrease in the difference in surface energies between the THV terpolymer and the binder to improve the wetting therebetween, as demonstrated in Examples I, II(A), and II(B).

In fact, as shown in Examples I, II(A), and II(B), the improved wetting between THV and the binder resin provides such sufficient attachment therebetween that a single coat non-stick coating composition including THV demonstrates superior substrate adhesion, release properties, and intracoat cohesion to known compositions, even without a binder which does not include terminal amine or amide groups, such as polyether sulfone ("PES"). The benefit of including THV in a coating composition having a binder with terminal amine or amide groups is described below.

Regarding (2) above, the ability of THV to form chemical bonds with terminal amine and amide groups increases the intracoat cohesion between THV and binders which include terminal amine and amide groups, such as polyamideimide ("PAI"). This is type of bonding is illustrated by the well known chemistry associated with the vulcanization of THV elastomeric polymers, such that described in literature available from the 3M Company for use with its Fluorel® Fluoroelastomers. (Fluorel® is a registered trademark of Minnesota Mining and Manufacturing Co.). For example, such polymers undergo chemical crosslinking with diamines by the following reactions:

The amine functionality shown above in reactions (1) and (2) for terminal amine groups is also available for the amide groups of the PAI resin.

Figure 2:
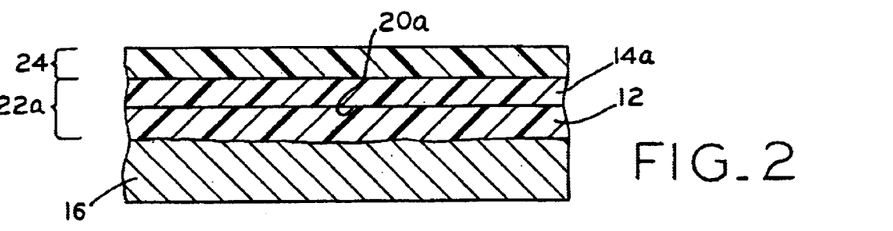
FIG. 2 is a schematic illustration showing a substrate having a primer in accordance with the present invention adhered thereto, and a topcoat adhered to the primer.

This improved intracoat cohesion in a primer for a multicoat system, which primer includes the THV terpolymer, for example, and a binder having terminal amine and amide groups, is schematically illustrated in FIG. 2, wherein a large degree of stratification between binder 12 and fluoropolymer 14a, which includes THV, for example, is allowed, to maximize primer-substrate and primer-topcoat adhesion, while maintaining strong intracoat cohesion within primer 22a between binder 12 and fluoropolymer 14a via the chemical bonding between binder 12 and fluoropolymer 14a, shown at 20a.

The fluoropolymers may comprise approximately 15 to 60% by weight of the solid content of the primer, wherein approximately 5 to 100% by weight of the fluoropolymers are capable of reacting with the amide and amine function groups of the binder resin. Such fluoropolymers may have a melt viscosity of greater than about $10^3$ poise. Additionally, the fluoropolymer capable of reacting with the amide and amine functional groups of the binder resin may include 5–30% by weight vinylidene fluoride (—$CH_2$—$CF_2$—) therein. The foregoing fluoropolymers may also be blended with other fluoropolymers such as polytetrafluoroethylene ("PTFE"), fluorinated ethylenepropylene ("FEP"), and perfluoroalky ("PFA").

Binder resins may include polyester, polyamide, polyamideimide, polyimide. polyether sulfone, polyphenylene sulfide, polyether ether ketone, silicone, epoxy, and acrylic resins, and blends of the foregoing. The binder resins may comprise approximately 10 to 40% by weight of the solid content of the primer, wherein approximately 20 to 100% by weight of the binder resin may include a resin with amide and/or amine functional groups.

Fillers may include inorganic metal oxides and metal oxide complexes, such as titanium dioxide, chromium dioxide, zinc oxide, iron oxide, aluminum oxide, silicon oxides. zirconium oxide, and mixtures of the foregoing; silicates, such as aluminum silicate, magnesium aluminum silicate, and mixtures of the foregoing; and inorganic carbides and nitrides, such as silicon carbide, titanium carbide, silicon nitride, titanium nitride, and boron nitride, and mixtures of the foregoing.

Pigments may include ultramarine blue zeolite, channel black, carbon black, and mixtures thereof. The pigments and fillers together may comprise from 20 to 60% by weight of the primer.

A topcoat and one or more midcoats may be applied directly to the primer. The topcoat and midcoats may include polytetrafluoroethylene ("PTFE"), fluorinated ethylene propylene ("FEP"), perfluoroalkyl ("PFA"), or a combination of the foregoing, along with suitable pigments, wetting agents, and coalescing aids, and may be applied by spraying, curtain coating, or roller coating.

The substrate may consist, for example, of stainless steel, carbon steel, or aluminum, which is smooth or has been chemically etched or mechanically roughened by gritblasting or abrasion with grit impregnated pads, cloth, or paper to an average surface roughness of 0.5 $\mu$m to 2 $\mu$m (20–80 microinches) Ra, or alternatively, 2 $\mu$m to 5 $\mu$m (80–200 microinches) Ra.

EXAMPLES

Example 1

Comparison of Damage Resistance Between Coatings Having Varying Proportions of THV and PTFE Fluoropolymer Resins Mixtures of high temperature resistant organic binders with fluoropolymers and fillers were prepared, with the binders and fluoropolymers present at a fixed ratio with respect to each other. The mixtures were prepared from a base containing an aqueous solution of polyamide imide resin into which had been dispersed by ball milling a polyethersulfone ("PES") resin, as well as pigments and fillers including finely divided alumina, ultramamine blue and carbon black pigments. To this base was added in varying proportions an aqueous dispersion of PTFE and an aqueous dispersion of THV fluoropolymer terpolymer resin containing reactive vinylidene fluoride monomers. The coatings were formulated in such a way that the total amount of fluoropolymer to other ingredients was held constant while the ratio of one fluoropolymer to the other was varied. The composition of the solid ingredients in the coatings by weight was as follows:

TABLE I

Formulations of coatings with varying proportions of PTFE and THV.

| Coating Number | 1 | 2 | 3 | 4 | 5 | 6 |
|---|---|---|---|---|---|---|
| Polyamideimide resin | 22 | 22 | 22 | 22 | 22 | 22 |
| Polyethersulfone resin | 6 | 6 | 6 | 6 | 6 | 6 |
| Polytetrafluoroethylene resin | 42 | 40 | 38 | 33 | 16 | 0 |
| Terpolymer of TFE/HFP/VdF | 0 | 2 | 4 | 9 | 26 | 42 |
| Carbon Black pigment | 2 | 2 | 2 | 2 | 2 | 2 |
| Aluminum Oxide (Fine Particle Size) | 15 | 15 | 15 | 15 | 15 | 15 |
| Zinc Oxide | 1 | 1 | 1 | 1 | 1 | 1 |
| Ultramarine Blue pigment | 12 | 12 | 12 | 12 | 12 | 12 |
| Total | 100 | 100 | 100 | 100 | 100 | 100 |

Test panels were prepared for each coating using 7"×7"× 0.063" panels of 3003 aluminum alloy. The test panels were prepared by chemically cleaning and etching in a commercial dishwasher. The panels were exposed first to one six minute washer cycle using a solution of 5% sodium hydroxide at ~65° C., followed by a deionized water rinse and a second six minute cycle using 1% nitric acid at ~65° C., followed by a deionized water rinse and drying. This treatment produced a clean, smut-free surface with an average roughness of ~30 microinches (0.75 micron).

Each coating was applied to a respective panel by spraying to a dry film thickness of 15–20 $\mu$m, and was cured for 5 minutes at 400° C. metal temperature. The panels were tested for 30 minutes using the mechanical scratch tester as described in Test Method A, as set forth in Appendix A. The results were as follows:

TABLE II

Mechanical scratch test results of the coatings of Table I.

| Coating Number | 1 | 2 | 3 | 4 | 5 | 6 |
|---|---|---|---|---|---|---|
| Scratch adhesion result, 10 = best | 1 | 4.5 | 5 | 5.5 | 4.5 | 4 |

The results indicate that even a small amount of the THV terpolymer improves the damage resistance of the coating.

Example II(A)

Comparison of Binder-Fluoropolymer Intracoat Cohesion Between Coating Compositions Respectively Containing FEP and THV Fluoropolymers Mixtures of polyethersulfone (PES) resin were prepared with an inorganic pigment and either: (1) a powder form of a fluorinated ethylenepropylene "FEP" fluoropolymer (a copolymer of tetrafluoroethylene and hexafluorofluoropropylene) or (2) a powder form of the THV fluoropolymer terpolymer described above. The mixtures were made by dissolving the PES resin in a blend of N-methylpyrrolidone and xylene and dispersing a mixed metal oxide green pigment (Shephard #223 Green) into the resin solution by bead milling. The two powders were added by mixing and bead milling to achieve a suitable dispersion and smoothness. The composition of the solid ingredients in the two mixtures by weight was as follows:

TABLE III

Formulations of coatings with varying proportions of FEP and THV.

| Coating Number | 1 | 2 |
|---|---|---|
| PES | 42 | 42 |
| FEP | 0 | 33 |
| Terpolymer of TFE/HFP/VdF | 33 | 0 |
| Inorganic Green pigment | 25 | 25 |
| Total | 100 | 100 |

The mixtures were sprayed onto aluminum "Q" Panels, prepared as described above in Example I, to a dry film thickness of 20 μm and cured 5 minutes at 400° C.

On inspection, the coating containing FEP had a heavy waxy surface layer that could be removed with a fingernail down to a glossy lower layer. This indicated a sharp separation/stratification of the organic binder and FEP. as well as a loss of intracoat cohesion between the binder and fluoropolymer within the dried film. In contrast, the coating with the terpolymer fluoropolymer resin showed no removable waxy surface layer and excellent intracoat cohesion between the binder and fluoropolymer. This observation demonstrates the improved compatibility of the terpolymer resin compared to a higher fluorinated, but non-reactive fluoropolymer resin.

Example II(B)

Comparison of Amount of Fluoropolymer Present at the Surface Thereof, Between Coating Compositions Respectively containing FEP and THV Fluoropolymers In a second experiment, one coated panel was prepared using each of the above coatings in the manner described above in Example II(A). A cyanoacrylate glue was applied between the coated panels. The panels were clamped together for several minutes to cure the glue, and after curing the panels were forced apart. The glue completely released from the coating containing the terpolymer flurorpolymer resins, while glue residue was observed remaining on the surface of the FEP-containing coating. This result indicates that the amount of fluoropolymer at the surface of the terpolymer resin coating was equal to or greater than the amount of fluoropolymer at the surface of the FEP coating and the release properties of the former were superior to the latter.

Example III

Preparation and Physical Testing of Primer Compositions Respectively Containing FEP and THV Fluoropolymers Primers were prepared using mixing processes typical of coatings manufacturing operations. An aqueous solution of Torlon AI-10, polyamide imide resin, was first prepared by dissolving the resin in a mixture of N-methyl pyrrolidone ("NMP"), furfuryl alcohol, dimethylamine ethanol ("DMAE"), and wetting agents/surfactants in water, in a manner similar to that described in U.S. Pat. No. 4,049,863 to Vassiliou. Fillers were dispersed in this solution, and two portions of the solution were then blended with respective aqueous dispersions of the FEP and THV fluoropolymers. The primer formulations are set forth in Table IV below, which table sets forth the composition of the "wet". or liquid phase, primer before application of the primer to the substrate followed by curing:

TABLE IV

Formulations of primers respectively including THV and FEP.

| | Primer 1 | Primer 2 |
|---|---|---|
| Binder Resins: | | |
| Torlon AI-10 Polyamideimide Resin | 7.5 | 7.5 |
| Fluoropolymers Resins: | | |
| Daikin D-3B Polytetrafluoroethylene Dispersion | 6.6 | 6.6 |
| Dyneon THV E-15851 Dispersion | 3.4 | — |
| Daikin ND-1 FEP Dispersion | — | 3.4 |
| Other Solid Ingredients | | |
| Norton E-330 Aluminum Oxide (Alumina) | 4.0 | 4.0 |
| Ferro RB-30 Untramarine Blue Pigment | 2.7 | 2.7 |
| Zinc Oxide | 0.1 | 0.1 |
| Channel Black Pigment | 1.0 | 1.0 |
| Other | | |
| Water | 66.0 | 66.0 |
| NMP | 4.0 | 4.0 |
| Furfuryl alcohol | 1.5 | 1.5 |
| DMAE | 1.5 | 1.5 |
| Air Products Surfylol 440 | 1.0 | 1.0 |
| Triton X-100 | 0.7 | 0.7 |
| Total | 100.0 | 100.0 |

Rolled aluminum (alloy 1100) disks, ~7" in diameter and 0.635" thick, were prepared by chemically cleaning and etching in a commercial dishwasher. The disks were exposed first to one six minute washer cycle using a solution of 5% sodium hydroxide at ~65° C., followed by a deionized water rinse and a second 6 minute cycle using 1% nitric acid at ~65° C. followed by a deionized water rinse and drying. This treatment produced a clean, smut-free surface with an average roughness of ~30 microinches (0.75 micron). The primer compositions given as Primer 1 and Primer 2 above were sprayed onto respective ones of the disks. The primers were applied to a dry film thickness of 8–10 microns and dried for 2 minutes at 95° C. to produce a coating that was dry to the touch.

Following drying, a topcoat of a composition similar to that described in U.S. Pat. No. 4,049,863 to Vassiliou was sprayed onto the disks at a dry film thickness of 18–20 microns. The disks were dried for 2 minutes at 95° C., and cured for 5 minutes at 430° C. to produce a smooth, glossy black non-stick coating.

The disks were subject to various tests to evaluate the adhesion and durability of the coating systems. Disks with both Primer 1 and Primer 2 had excellent resistance to knife scratching and excellent adhesion when subjected to cross hatching and boiling in water for 15 minutes.

Further, both had similarly good scratch resistance when evaluated by a mechanical scratch tester as described in Test Method A, as set forth in Appendix A hereto. Test method A simulates the scratching action of a fork, and is a measure of resistance of the coating to penetration by a sharp point.

However, there were significant differences found when the disks were evaluated by a mechanical knife scratch tester as described in Test Method B, as set forth in Appendix B hereto. Test method B simulates the scraping action of a spatula and the cutting action of a knife blade, wherein ratings may be applied thereto based on the observed results (which ratings are set forth in Test Method A). In this test, a significant portion of the topcoat applied over Primer 2 was scraped off, resulting in a rating of about 6, while the topcoat applied over Primer 1 remained almost entirely intact, resulting in a rating of about 9. This demonstrates both (1) the improved adhesion between Primer 1 and the topcoat (intercoat adhesion) and (2) the improved cohesion within the Primer 1 itself (intracoat cohesion) over Primer 2, where Primer 1 includes the THV and Primer 2 includes FEP.

Example IV

Preparation and Physical Testing of a Primer Composition Containing THV. and a Combination of Polyamideimide and Polyether Sulfone Resins A primer composition including THV was prepared in accordance with the procedure set forth in Example III above, wherein part of the polyamideimide organic binder resin was replaced with polyether sulfone. The primer formulation is set forth in Table V below, which table sets forth the composition of the "wet", or liquid phase, primer before application to a substrate followed by curing:

TABLE V

Formulation of a primer containing THV and a combination of polyamideimide and polyether sulfone resins.

| Examples | Primer 3 |
|---|---|
| Binder Resins: | |
| Torlon AI-10 Polyamideimide Resin | 6.0 |
| Radel A700X Polyether Sulfone Resin | 1.5 |
| Fluoropolymers Resins: | |
| Daikin D-3B Polytetrafluoroethylene Dispersion | 6.6 |
| Dyneon THV E-15851 Dispersion | 3.4 |
| Daikin ND-1 FEP Dispersion | — |
| Other Solid Ingredients | |
| Norton E-330 Aluminum Oxide (Alumina) | 4.0 |
| Ferro RB-30 Untramarine Blue Pigment | 2.7 |
| Zinc Oxide | 0.1 |
| Channel Black Pigment | 1.0 |
| Other | |
| Deionized water | 66.0 |
| N-methyl pyrrolidone (NMP) | 4.0 |
| Furfuryl alcohol | 1.5 |
| Dimethylamino ethanol (DMAE) | 1.5 |
| Air Products Surfylol 440 (surfactant) | 1.0 |
| Triton X-100 (surfactant) | 0.7 |
| Total | 100.0 |

Prior to adding to the formula, the polyether sulfone resin was ground by ball milling for 72 hours in a water slurry until it was reduced in particle size to less than 15 microns average. The above primer formula was coated onto aluminum disks prepared as described above in Example III. and a topcoat was applied thereto, again as described above in Example III. The resulting coating system including Primer 3 had adhesion and scratch resistance, as measured by Test Methods A and B, respectively, which were superior to Primer 1, and additionally, Primer 3 had better flexibility than Primer 1.

Although several broad examples which incorporate the present invention have been described above, it is to be understood that the present invention is not to be limited by the examples disclosed herein. Indeed, the disclosure and examples above teach one of ordinary skill a virtually limitless number of conditions which would be within the scope of the claims appended hereto.

Further, while this invention has been described as having a preferred design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

Appendix A

Test Method A

Mechanical Scratch Adhesion

1. Scope:

Coatings for cookware are susceptible to abuse and damage by scratching and cutting with metal utensils. Resistance to this kind of damage is often measured by a so called "Tiger Paw" test. In this test, a device equipped with ball point pen tips is used to stir food cooking in a piece of coated cookware. The pen points simulate damage by metal utensils, and provide a convenient renewable test implement. However, the "Tiger Paw" test is long in duration, difficult to control and subjective to evaluate.

Figure 3:
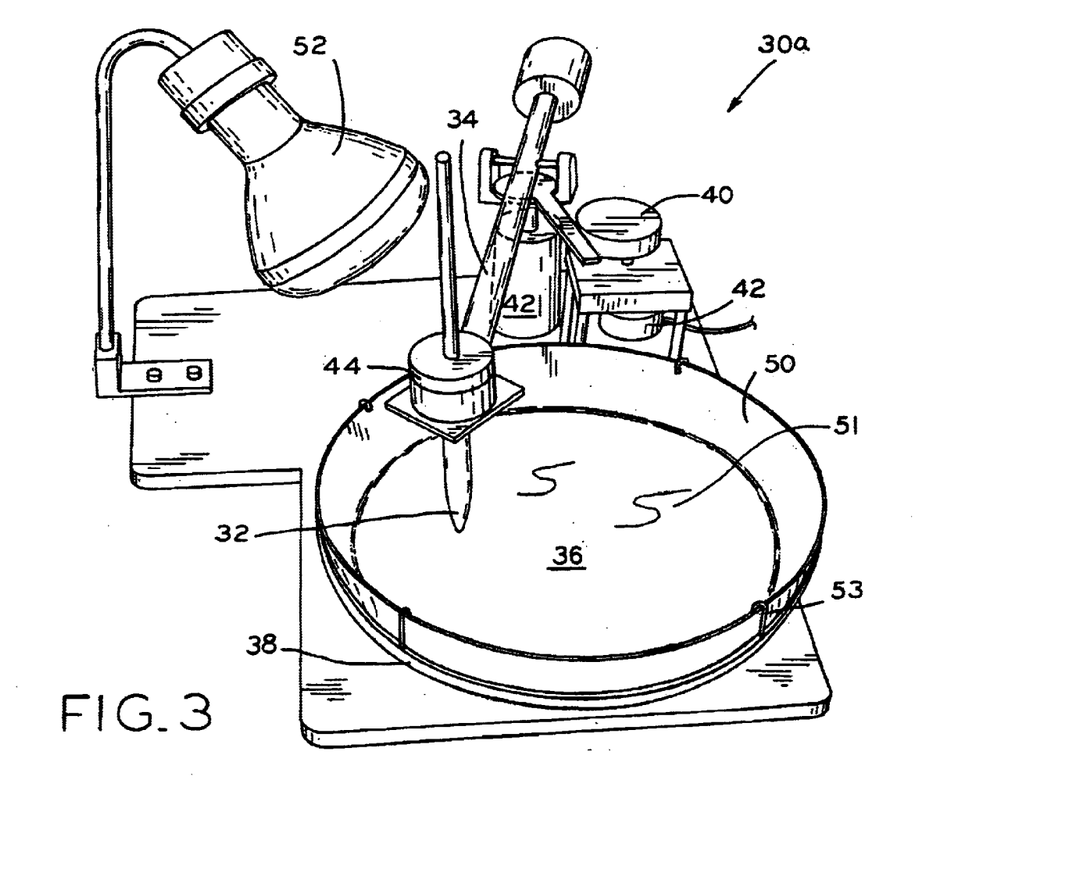
FIG. 3 is a perspective view of a test apparatus for carrying out the mechanical scratch adhesion test of Test Method A, which is set forth in Appendix A.

Test Method A describes a procedure and apparatus that inflicts similar abuse on coatings, yet is reproducible, objective and quick. As shown in FIG. 3. test apparatus 30a includes weighted ball point pen tip 32 affixed to balance arm 34, where pen tip 32 is placed on coated substrate surface 36 which is revolving on turntable 38. At the same time, balance arm 34 oscillates from side to side by means of revolving cam 40. Turntable 38 and cam 40 are driven by constant speed DC motors 42. The speed of turntable 38 and cam 40 are controlled by variable DC power supplies. The amplitude of oscillation is controlled by the degree of eccentricity in cam 40. Weight 44 is variable. By adjusting the speeds of motors 42 and the amplitude of oscillation of balance arm 34, various scratch patterns may be obtained. These can be adjusted to cover a small or large surface area.

To further simulate the conditions encountered by coatings for non-stick cookware, test piece 50 (panel or pan) is covered with hot oil 51. The temperature of oil 51 is maintained with IR heat lamps 52 and is monitored with a thermometer or thermocouple (not shown).

2. Equipment and Materials:

2.1 Mechanical scratch adhesion apparatus 30a with set of weights 44.

2.2 Ball point pen tip 32, such as Paper Mate medium point standard refill cartridges or equivalent.

2.3 Hot plate 2.4 Cooking oil 51

2.5 Thermometer or digital read out with thermocouple wire 2.6 Small clips 53

2.7 Shallow pan approximately 10 inches (25 cm) in diameter.

2.8 Set (2 or 3) of 250 watt infrared heating lamps 52 on stands.

3. Procedure:

3.1 Check the balance and level of balance arm 34 with test piece 50 in position. Adjust if necessary. Remove test piece 50. Set the amplitude of the oscillation by choosing the proper cam setting. Set the minimum and maximum radius by loosening the balance arm retaining screw (not shown) and adjusting at the extremes of cam 40. Usually, a center circle of about 2 inches is allowed in the test pattern.

3.2 Without weight on balance arm 34, and holding pen 32 above turntable 38, adjust the speed of turntable 38 and cam 40. Typically, cam 40 moves at a rate of 0 to 3 times faster than turntable 38.

3.3 Place a piece of paper on turntable 38 and hold in place with tape. Load pen 32 with a light weight 44 (approx. 200 grams.) Place pen 32 on the paper and allow to trace the scratch pattern it will follow. Save the pattern. This is also a check of the functioning of pen 32. If pen 32 does not write, replace it.

3.4 Remove paper. Center test piece 50 on turntable 38. (If testing panels (not shown), place test piece 50 on turntable 38 and place panels in test piece 50. Panels must be of a size large enough to accommodate the size of the scratch pattern). Using clips 53, anchor test piece 50 to turntable 38. Holding pen 32 above test piece 50, turn on turntable 38 and cam 40 and observe several revolutions to ensure that the scratch pattern is entirely on test piece 50. Turn off motor 42.

3.5 Heat sufficient cooking oil 51 to cover test surface by about ¼ inch. Heat to test temperature. (CAUTION: Above about 150° C., cooking oils 51 emit fumes and strong odors. Also, they become quite flammable. If running over 150° C., conduct test in a well ventilated area, preferably in a fume hood.) Pour hot oil 51 into test piece 50. Position IR lamps 52 close to test piece 50 and turn on to maintain temperature of oil 51. Some pre-testing of the proper position of lamps 52 will be required to maintain the temperature within a range of ±5° C. Monitor every 5 minutes during test, and adjust position of lamps 52 to hold this tolerance. (A continuously reading temperature gauge is most convenient for this measurement.)

3.6 Place a proper weight 44 on balance arm 34. Typically, this will vary from 250 to 1000 grams. Start both motors 42 and place pen 32 gently on coated surface 36. Allow the test to run for the required length of time.

4. Evaluation:

4.1 Record the following information: (1) speed of turntable 38 and cam 40 in rpm; (2) cam amplitude setting (number or distance from inside to outside radius in cm); (3) load on pen point 32 in grams; (4) temperature of oil 51; (5) duration of test; and all test piece parameters (substrate and substrate preparation, coating, thickness, cure, etc.).

4.2 Remove test piece 50, drain oil 51, and wash in warm water and mild detergent. Blot dry with paper towel. Visually observe the damage to the coating surface 36. This may be done on a comparative basis against other test specimens, or may be rated on the scale set forth below. In general, performance levels have been rated as follows:

TABLE VI

| | Performance levels | |
|---|---|---|
| 10 | No effect | Light scratching of the surface. No break through at any place in the scratch pattern. |
| 8 | Slight | Light scratching of the surface. Inner circle of pattern is cut through to metal 100%. Outer circle cut through to metal <50%. |
| 6 | Moderate | Moderate scratching between inner and outer circle. Inner and outer circle both cut through to metal (inner usually worse that outer.) At this point begin inspecting and noting adhesion loss between coats or to substrate. |
| 4 | Considerable | Less than 25% loss of coating between inner and outer circuit. (Estimate and record amount.) Considerable cut through and fraying at the inner and outer circles. |
| 2 | Severe | Between 25% to 50% loss of coating between inner and outer circle. Severe loss of coating at inner and outer circles. Metal substrate quite apparent. |
| 0 | Total Failure | Greater than 50% loss of adhesion and coating surface. |

5. Comments and Precautions:

5.1 The preferred approach to running this test is to establish a set of operating parameters for speeds of turntable 38 and cam 40, the oscillating amplitude, and temperature of oil 51, then vary the load or time. Once this has been established, setting up individual tests proceeds quickly and smoothly.

5.2 Check balance arm 34 and oscillation of balance arm 34 frequently to ensure that it has not become loose and changed.

5.3 This test can be run cold, i.e., without hot oil 51.

Appendix B

Test Method B

Resistance to Mechanical Damage by Knife Cutting and Scraping

1. Scope:

This test simulates the cutting and scraping action of metal kitchen utensils on a non-stick coated surface. It measures the resistance to slicing through the coating by the edge of a blade as well as resistance to sideways scraping by a blade. Therefore, the test is a good indicator of resistance to damage by kitchen utensils such as metal spatulas. The test is very reproducible, and readily distinguishes differences in the hardness, toughness and adhesion (especially intercoat adhesion) of coatings systems.

Figure 4:
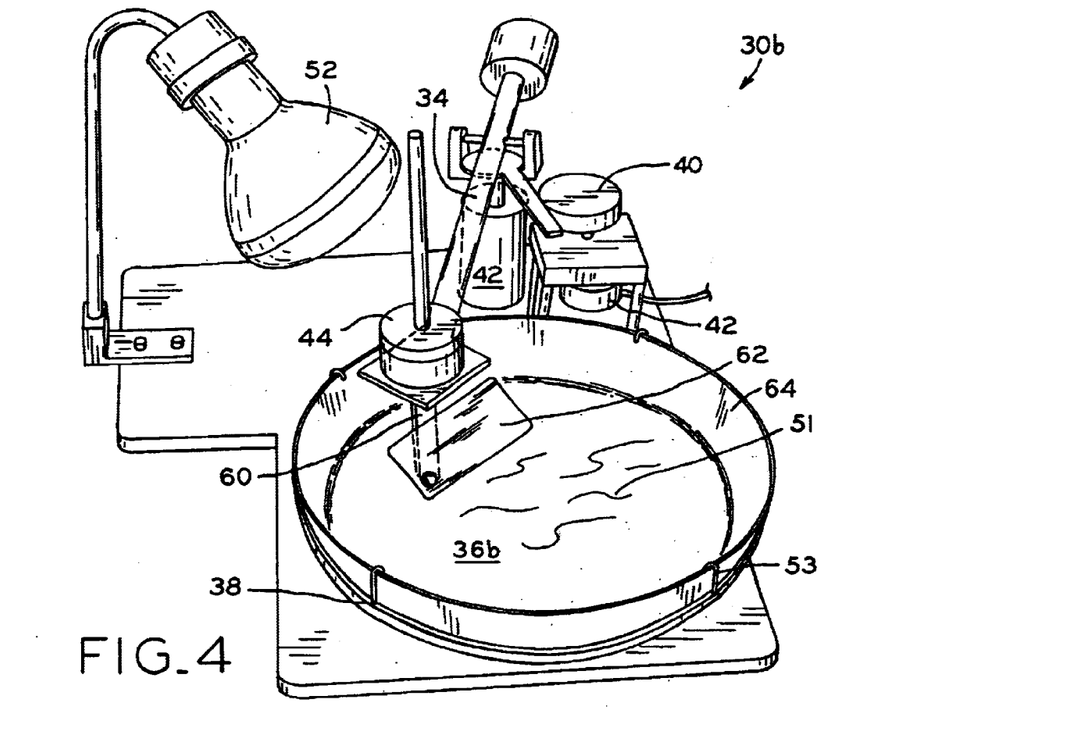
FIG. 4 is a perspective view of an apparatus for carrying out the resistance to mechanical damage by knife cutting and scraping test of Test Method B, which is set forth in Appendix B.

2. Equipment and Materials:

2.1 Mechanical scratch adhesion apparatus 30b, such as that shown in FIG. 4, with set of weights 44 and fixture arm 60 to hold blade 62 at a proper angle to coated substrate surface 36b.

2.2 Steel Q-Panel blades 62 (Type QD-35), available from Q-Panel Company.

2.3 Timer.

3. Procedure:

3.1 Position test piece 64 on the center of turntable 38 of scratch adhesion apparatus 30b.

3.2 Lock a new Q-Panel blade 62 into place in fixture arm 60. Make sure that panel blade 62 is in the position shown in FIG. 4.

3.3 Load fixture arm 60 with weight 44. Typically, this weight is between 750 to 1,000 g. A standard weight 44 is 900 g. Lock fixture arm 60 so that fixture arm 60 does not make contact with test piece 64.

3.4 Start turntable 38. The speed should be 15–16 rpm in an anti-clockwise direction. Start cam 40 to oscillate fixture arm 60. The cam speed should be 20–22 rpm. Release fixture arm 60 and set the edge of panel blade 62 gently on substrate surface 36b of test piece 64.

3.5 Continue running the test until an agreed upon endpoint is reached. Usually, this test is run for two hours or until 10% of the substrate is revealed.

Figure 5:
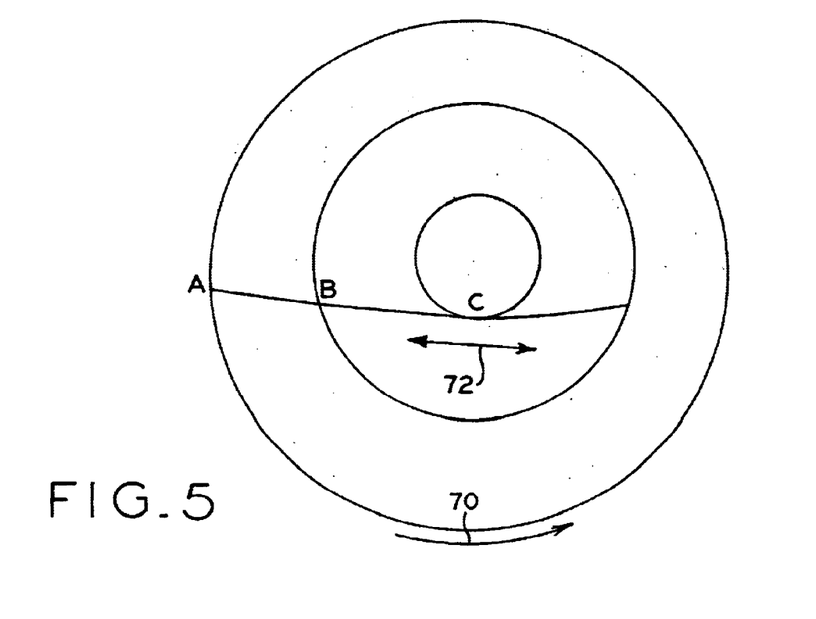
FIG. 5 is a schematic illustration showing the cutting and scraping action of a blade of the testing apparatus of FIG. 4 upon a substrate surface.

4. Evaluation:

4.1 Refer to FIG. 5. This drawing shows the motion of test piece 64 at 70 and the motion of panel blade 62 at 72.

4.2 Rate the amount of wear at Points A, B, and C according to the scale set forth in Table III of Test Method A. The area between A and B receives single scraping action at maximum circumferential speed. Panel blade 62 is perpendicular to the circle of rotation of test piece 64. Circle A receives the second greatest scraping damage. The area between B and C receives double scraping action at medium to low circumferential speed. Circle B receives the greatest scraping action. Circle C receives cutting action with panel blade 62 running tangential to the circle of rotation of test piece 64.

4.3 Photograph results.

4.4 If running a series of tests it is sometimes easier to rank the performance to provide a relative rating of damage resistance rather than an absolute number rating. Wear patterns can vary, and a single numerical rating does not always convey the true nature of the damage resistance of the coating.

What is claimed is:

1. A primer (22a) for a multilayered, non-stick coating system, said primer comprising:
   at least one binder resin (12) including at least one functional group selected from the group consisting of amide and amine functional groups; and
   at least one fluoropolymer resin (14a) being a copolymer of tetrafluoroethylene, hexafluoropropylene, and vinylidene fluoride, said copolymer having a melting point above about 160° C., said copolymer further comprising 5% to 30% by weight of vinylidene fluoride and being capable of reacting with at least one of said amide and amine functional groups of said binder resin (12).

2. The primer (22a) of claim 1, wherein said binder resin (12) is selected from the group consisting of polyamideimide, polyamide, polyimide, and a combination thereof.

3. The primer (22a) of claim 2, further including an additional resin capable of reacting with said functional groups of said binder resin (12).

4. The primer (22a) of claim 1, further comprising an additional fluoropolymer resin including monomers selected from the group consisting of tetraflouroethylene, fluorinated ethylene propylene, perfluoroalkyl, and a combination thereof.

5. The primer (22a) of claim 1, wherein said fluoropolymer resin (14a) has a melting point above about 220° C.

6. The primer (22a) of claim 1, wherein said binder resin (12) comprises approximately 10% to 40% of the solid content of said primer (22a).

7. The primer (22a) of claim 1, wherein said functional group of said binder resin (12) comprises approximately 20% to 100% by weight of said binder resin.

8. The primer (22a) of claim 1, wherein said fluoropolymer resin (14a) comprises approximately 15% to 60% by weight of the solid content of said primer.

9. The primer (22a) of claim 1, wherein said fluoropolymer resin (14a) has a melting point between about 160° C. and about 250° C.

10. The primer (22a) of claim 1, wherein said fluoropolymer resin (14a) has a melt viscosity of greater than about $10^3$ poise.

11. The primer (22a) of claim 1, further including a filler material selected from the group consisting of zinc oxide, aluminum oxide, zirconium oxide, titanium dioxide, iron oxide, chromium dioxide, silicon oxide, aluminum silicate, magnesium aluminum silicate, silicon carbide, titanium carbide, silicon nitride, titanium nitride, boron nitride, and mixtures thereof.

12. The primer (22a) of claim 11, further including a pigment, said pigment selected from the group consisting of ultramarine blue zeolite, channel black, carbon black, and mixtures thereof.

13. The primer (22a) of claim 12, wherein said pigments and said fillers comprise approximately 20% to 60% by weight of said primer.

14. A multiple-coat, non-stick coating system, comprising:
   a primer, said primer comprising:
      a binder resin (12) including at least one resin selected from the group consisting of polyamideimide, polyamide, and polyimide; and
      a fluoropolymer resin (14a) including a copolymer of tetrafluoroethylene, hexafluoropropylene, and vinylidene fluoride monomers, said copolymer having a melting point above about 160° C.; and comprising 5% to 30% by weight of vinylidene fluoride and a topcoat.

15. The coating system of claim 14, wherein said binder resin includes an additional resin selected from the group consisting of silicone, polyether sulfone, polyphenylene sulfide, polyether ether ketone, and a combination thereof.

16. The coating system of claim 14, wherein said primer further includes an additional resin including monomers selected from the group consisting of tetrafluoroethylene, fluorinated ethylene propylene, perfluoroalkyl, and a combination thereof.

17. The coating system of claim 14, further including at least one midcoat disposed intermediate said primer and said topcoat.

18. The coating system of claim 17, wherein said topcoat and said at least one midcoat include polytetrafluoroethylene.

19. The coating system of claim 14, wherein said primer further includes a filler material selected from the group consisting of zinc oxide, aluminum oxide, zirconium oxide titanium dioxide, chromium dioxide, silicon dioxide, aluminum silicate, magnesium aluminum silicate, silicon carbide, titanium carbide, silicon nitride, titanium nitride, boron nitride, and mixtures thereof.

20. The coating system of claim 14, wherein said primer further includes a pigment selected from the group consisting of ultramarine blue zeolite, channel black, carbon black, and mixtures thereof.

21. The coating system of claim 14, wherein said binder resin comprises 10% to 40% by weight of the solid content of said primer.

22. The coating system of claim 14, wherein said fluoropolymer resin has a melting point above about 220° C.

23. A substrate (16) coated with a multiple-coat, non-stick coating, said non-stick coating comprising:
   a primer (22a) applied directly on said substrate (16), said primer comprising:

a binder resin (12) including at least one resin selected from the group consisting of polyamideimide, polyamide, and polyimide;

a fluoropolymer resin (14a) including a copolymer having tetrafluoroethylene, hexafluoropropylene, and vinylidene fluoride monomers; said copolymer having a melting point above about 160° C. and comprising 5% to 30% by weight of vinylidene fluoride; and a filler material; and a topcoat (24) applied on said primer, said topcoat comprising polytetrafluoroethylene.

24. The substrate (16) of claim 23, wherein said primer further includes an additional resin including monomers selected from the group consisting of tetrafluoroethylene, fluorinated ethylene propylene, perfluoroalkyl, and a combination thereof.

25. The substrate (16) of claim 23, wherein said topcoat includes an additional resin including monomers selected from the group consisting of fluorinated ethylene propylene, perfluoroalkyl, and mixtures thereof.

26. The substrate (16) of claim 23, wherein said primer and said topcoat are sequentially applied by at least one of spraying, curtain coating, and roller coating.

27. The substrate (16) of claim 23, wherein said substrate (16) is selected from the group consisting of stainless steel, carbon steel, and aluminum having a surface roughened to an average roughness of about 2–5 $\mu$m.

28. The substrate (16) of claim 23, wherein said substrate (16) is aluminum etched to an average roughness of about 0.5 to 2 $\mu$m.

29. The substrate (16) of claim 23, wherein said filler material is selected from the group consisting of zinc oxide, aluminum oxide, zirconium oxide, titanium dioxide, chromium dioxide, silicon dioxide, aluminum silicate, magnesium aluminum silicate, silicon carbide, titanium carbide, silicon nitride, titanium nitride, boron nitride, and mixtures thereof.

30. The substrate (16) of claim 23, wherein said primer further includes a pigment, said pigment selected from the group consisting of ultramarine blue zeolite, channel black, carbon black, and mixtures thereof.

31. The substrate of claim 23, further including at least one midcoat disposed intermediate said primer and said topcoat.

32. The substrate of claim 23, wherein said binder resin comprises 10% to 40% by weight of the solid content of said primer.

33. The substrate of claim 23, wherein said fluoropolymer resin has a melting point above about 220° C.

34. A method of applying a non-stick coating system to a smooth substrate (16), comprising the steps of:

dissolving a binder resin (12) in a solvent, the binder resin selected from the group consisting of polyamideimide, polyamide, and polyimide;

blending the dissolved binder resin with an aqueous dispersion of a fluoropolymer resin (14a) to form a primer, the fluoropolymer resin including a copolymer having monomers of tetrafluoroethylene, hexafluoropropylene, and vinylidene fluoride, said copolymer comprising 5% to 30% by weight vinylidene fluoride;

applying the primer to a smooth substrate; and curing the applied primer.

35. The method of claim 34, wherein the binder resin includes an additional resin selected from the group consisting of silicone, polyether sulfone, polyphenylene sulfide, polyether ether ketone, and a combination thereof.

36. The method of claim 34, further including, before said applying step, the additional step of adding a filler material to the primer (22a), the filler material selected from the group consisting of zinc oxide, aluminum oxide, zirconium oxide, titanium dioxide, chromium dioxide, silicon dioxide, aluminum silicate, magnesium aluminum silicate, silicon carbide, titanium carbide, silicon nitride, titanium nitride, boron nitride, and mixtures thereof.

37. The method of claim 34, including the additional step of applying a topcoat on the applied primer (22a), the topcoat comprising polytetrafluoroethylene.

38. A primer for a multilayered, non-stick coating system, said primer comprising:

at least one binder resin comprising 10% to 40% by weight of the solid content of said primer and including at least one functional group selected from the group consisting of amide and amine functional groups; and at least one fluoropolymer resin being a copolymer of tetrafluoroethylene, hexafluoropropylene, and vinylidene fluoride, said copolymer having a melting point above about 160° C. and said copolymer comprising 5% to 30% vinylidene fluoride and being capable of reacting with at least one of said amide and amine functional groups of said binder resin.

39. The primer of claim 38, wherein said one fluoropolymer resin has a melting point above about 220° C.

* * * * *